(12) United States Patent  
Liang et al.

(10) Patent No.: US 9,270,068 B2  
(45) Date of Patent: Feb. 23, 2016

(54) MOVABLE SOCKET CAPABLE OF MOVING A CONNECTOR RELATIVE TO A CASING AND RELATED ELECTRONIC DEVICE

(71) Applicant: Wistron Corporation, New Taipei (TW)

(72) Inventors: Jyun-Shuo Liang, New Taipei (TW); Hung-Li Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 219 days.

(21) Appl. No.: 14/043,839

(22) Filed: Oct. 1, 2013

(65) Prior Publication Data

US 2014/0192494 A1 Jul. 10, 2014

(30) Foreign Application Priority Data

Jan. 7, 2013 (TW) .............................. 102100439 A

(51) Int. Cl.
*H01R 12/91* (2011.01)
*H01R 35/02* (2006.01)
*G06F 1/16* (2006.01)

(52) U.S. Cl.
CPC .............. *H01R 35/02* (2013.01); *G06F 1/1626* (2013.01); *G06F 1/1658* (2013.01); *G06F 1/1698* (2013.01); *H01R 2201/06* (2013.01)

(58) Field of Classification Search
CPC .. H01R 35/02; H01R 2201/06; G06F 1/1698; G06F 1/1658; G06F 1/1626

USPC ..................... 361/752, 785; 439/39, 502, 131
See application file for complete search history.

(56) References Cited

U.S. PATENT DOCUMENTS

| 7,483,262 B2 * | 1/2009 | Yin ........................ G06F 1/1616 361/679.01 |
| 8,780,547 B2 * | 7/2014 | Nakanishi .............. G03B 29/00 353/119 |
| 2010/0317203 A1 * | 12/2010 | Tracy .................... G06F 1/1656 439/131 |
| 2012/0015534 A1 * | 1/2012 | Wavra .................. G06F 13/409 439/131 |
| 2014/0213081 A1 * | 7/2014 | Wei .................... H01R 13/4534 439/136 |

* cited by examiner

*Primary Examiner* — Bernard Rojas
(74) *Attorney, Agent, or Firm* — Winston Hsu; Scott Margo

(57) ABSTRACT

A movable socket disposed between a casing and a circuit board is disclosed. An opening structure is disposed on the casing. The movable socket includes a first connector, a second connector, a soft cable and a driving mechanism. The first connector is slidably disposed on the casing. The second connector is disposed on the circuit board. The soft cable is disposed between the first connector and the second connector in a structurally deformable manner. Two ends of the soft cable are respectively connected to the first connector and the second connector. The driving mechanism is disposed between the first connector and the casing, the driving mechanism moves the first connector relative to the casing, to drive a part of the first connector to pass through the casing via the opening structure.

16 Claims, 10 Drawing Sheets

MOVABLE SOCKET CAPABLE OF MOVING A CONNECTOR RELATIVE TO A CASING AND RELATED ELECTRONIC DEVICE

BACKGROUND OF THE INVENTION

1. Field of the Invention

The present invention relates to a USB socket and a related electronic device, and more particularly, to a movable USB socket and a related electronic device.

2. Description of the Prior Art

With the development of information and computer technology, the size of a computer is becoming smaller and the computer is utilized in a wide variety of fields. In order to expand functions of a computer system for satisfying user's various demands, various external devices of the computer system come with the trend. For example, an external hard disk drive and a portable storage device can expand the memory capacity of the computer system. An external optical disk drive and an optical disk writer can expand multimedia access function of the computer system. A network cable allows the computer system to be connected to an internet so as to gather information online or surf webpage. However, because of the thinning size of the notebook computer, it brings more challenges for mechanical design. Connecting ports disposed on a side of the notebook computer will constrain the thickness of mechanism of the notebook computer.

For example, the USB connector for connecting to the datum transmission cable has a fixed size of the opening. So, the notebook computer needs to increase its thickness in order to match the size of the USB connector. Alternatively, the USB connector is exposed out of the notebook computer so as to affect an aesthetic feeling of appearance. Thus, the conventional connector mechanism has importance issues of satisfying the height specification as well as keeping the aesthetic feeling of appearance.

SUMMARY OF THE INVENTION

The present invention provides a movable USB socket and a related electronic device for solving above drawbacks.

According to the claimed invention, a movable socket disposed between a circuit board and a casing whereon an opening structure is formed is disclosed. The movable socket includes a first connector, a second connector, a soft cable and a driving mechanism. The first connector is slidably disposed on the casing. The second connector is disposed on the circuit board. The soft cable is disposed between the first connector and the second connector in a structurally deformable manner. Two ends of the soft cable are electrically connected to the first connector and the second connector. The driving mechanism is disposed between the first connector and the casing. The driving mechanism moves the first connector relative to the casing, so as to protrude apart of the first connector from the casing through the opening structure.

According to the claimed invention, the first connector includes a supporting component. A guiding slot is formed on a surface of the supporting component, and the guiding slot is slidably disposed on a boss of the casing.

According to the claimed invention, the guiding slot includes a first constraint portion, a second constraint portion and a connecting portion. The first constraint portion and the second constraint portion are respectively disposed on two ends of the connecting portion, and a width of the connecting portion is substantially smaller than widths of the first constraint portion and the second constraint portion.

According to the claimed invention, the driving mechanism further includes a rack, a driver and a gear. The rack is disposed on the casing. The driver is disposed on the first connector, and the driver includes a shaft. The gear is rotatably disposed on the shaft of the driver and engaged with the rack. The driver axially rotates the gear via the shaft so as to move the gear relative to the rack.

According to the claimed invention, the driving mechanism further includes a rack, a driver and a gear. The rack is disposed on the first connector. The driver is disposed on the casing, and the driver includes a shaft. The gear is rotatably disposed on the shaft of the driver and engaged with the rack. The driver axially rotates the gear via the shaft so as to move the gear relative to the rack.

According to the claimed invention, the driving mechanism further includes a first rack, a second rack and a bridging gear. The first rack is disposed on the first connector. The second rack is movably disposed on the casing. The bridging gear is engaged between the first rack and the second rack. The second rack moves relative to the casing so as to drive the first rack via the bridging gear.

According to the claimed invention, the driving mechanism further includes a magnetic component and an electromagnetic component. The magnetic component is disposed on the first connector. The electromagnetic component is electrically connected to the circuit board and adjacent to the magnetic component. The electromagnetic component and the magnetic component generate a magnetic force to move the first connector relative to the casing.

According to the claimed invention, the driving mechanism further includes a first resilient component and a constraining component. The first resilient component moves the part of the first connector out of the casing via the opening structure. Two ends of the first resilient component are respectively disposed on the first connector and the casing. The constraining component is movably disposed inside the casing for constraining a movement of the first connector relative to the casing.

According to the claimed invention, the casing includes a sliding slot structure whereinside the constraining component is disposed. The driving mechanism further includes a second resilient component disposed between the constraining component and the sliding slot structure.

According to the claimed invention, the constraining component includes an inclined guiding structure. The first connector pushes the inclined guiding structure to move the constraining component relative to the casing.

According to the claimed invention, an electronic device includes a casing, a circuit board and a movable socket. The casing includes an opening structure and a cover. The cover pivots to aside of the opening structure for covering the opening structure. The circuit board is disposed inside the casing. The movable socket includes a first connector, a second connector, a soft cable and a driving mechanism. The first connector is slidably disposed on the casing. The second connector is disposed on the circuit board. The soft cable is disposed between the first connector and the second connector in a structurally deformable manner. Two ends of the soft cable are electrically connected to the first connector and the second connector. The driving mechanism is disposed between the first connector and the casing. The driving mechanism moves the first connector relative to the casing, so as to protrude a part of the first connector from the casing through the opening structure.

The electronic device of the present invention has the movable socket for convenient application. The movable socket can move relative to the casing according to the user's demand, so that the movable socket of the present invention can be disposed on an inner place of the casing, and the lateral casing of the electronic device can be designed as the oblique structure or the round structure for thin-type appearance. The movable socket can be accommodated inside the casing when the movable socket is not in use, and the cover is utilized to cap over the opening structure for the aesthetic appearance. The driving mechanism can move the movable socket out of the casing for the connection with the external plug. The movable socket can rotate the cover and partly protrude from the casing, and then the external plug is easily connected to the movably socket.

The present invention further discloses several embodiments of the driving mechanism, which illustrates that the driving mechanism can include the combinations of the rack and the gear, the magnetic component and the electromagnetic component, or the resilient component and the constraining component. The driving mechanism of the movable socket can move the first connector into and out of the casing along the predetermined path manually or automatically; therefore, the present invention has advantages of the aesthetic appearance and the convenient operation, to effectively overcome drawbacks of difficult utilization of the conventional socket.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
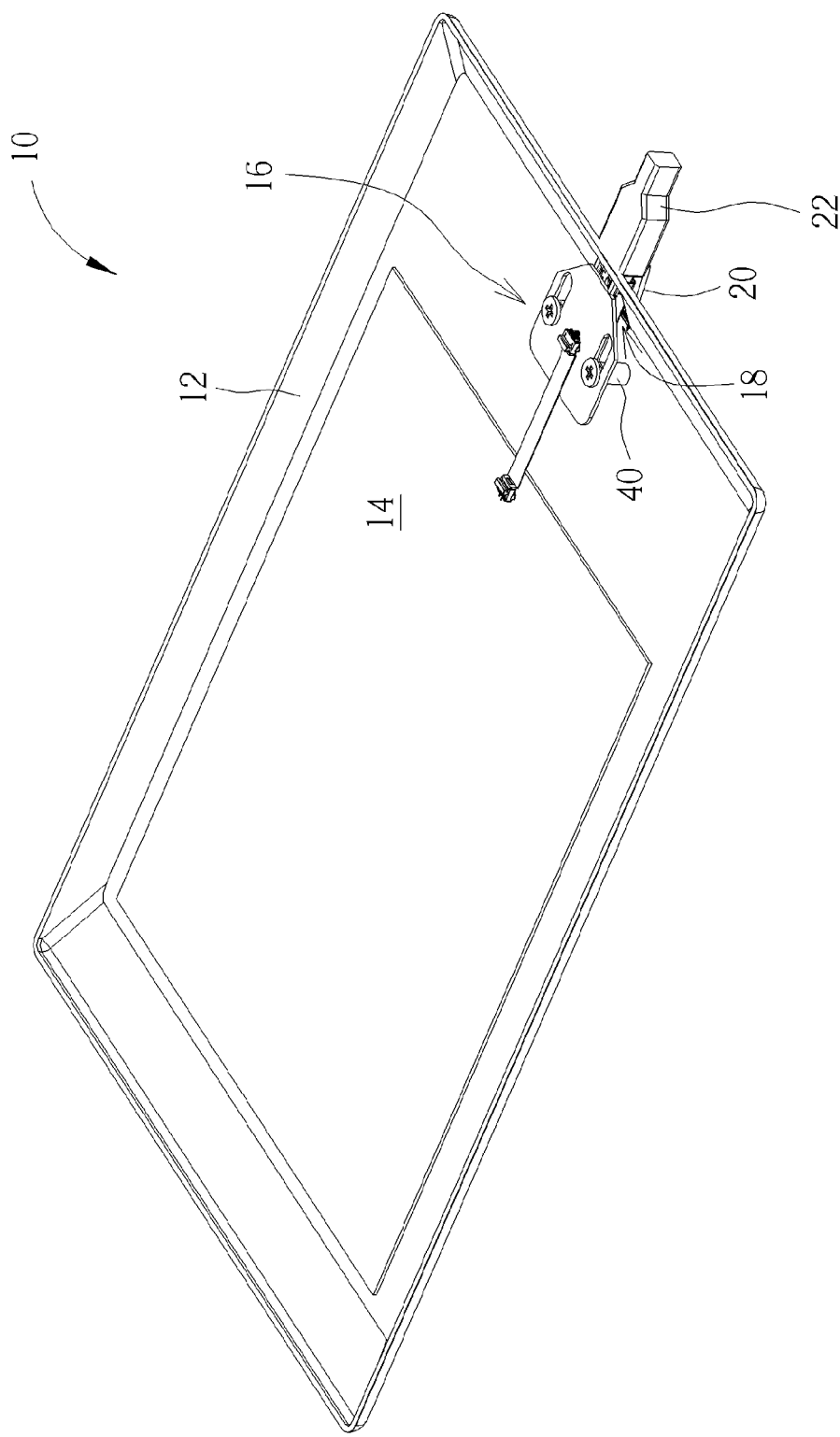
FIG. 1 and FIG. 2 respectively are diagrams of an electronic device in different views according to an embodiment of the present invention.
Figure 2:
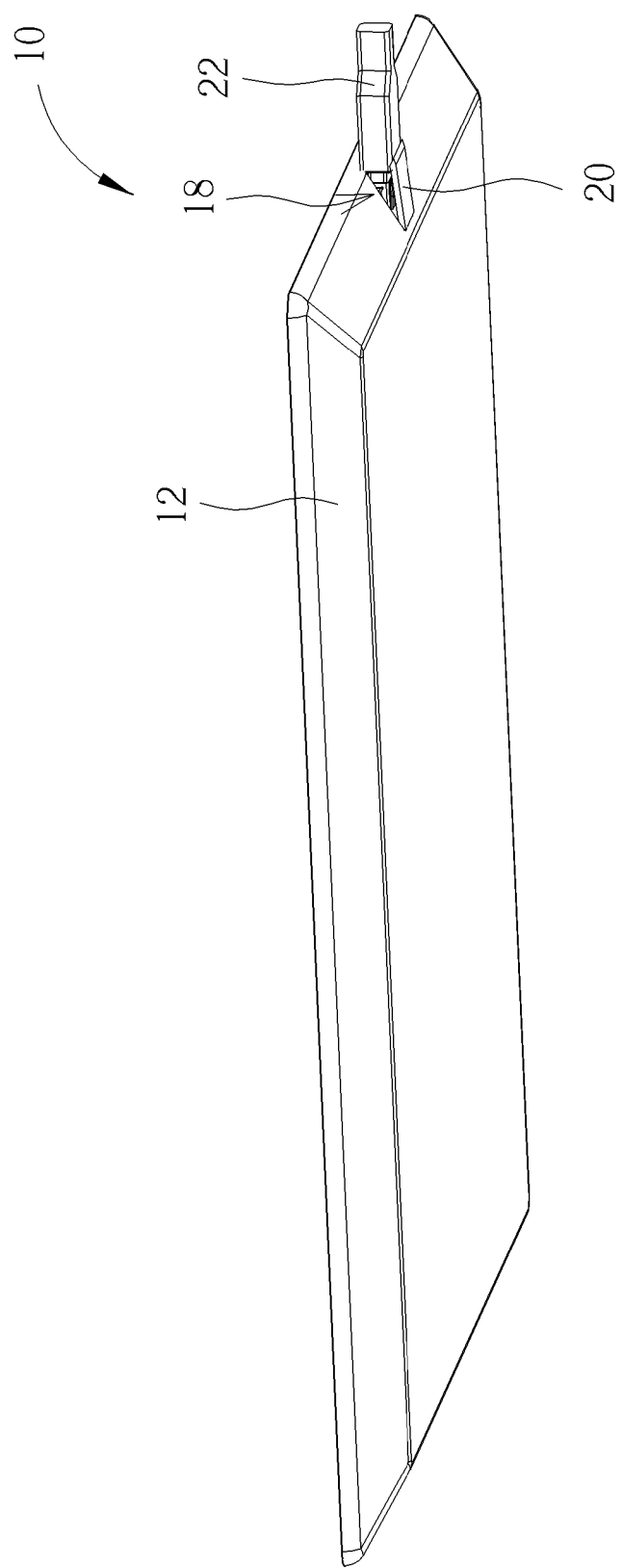

Please refer to FIG. 1 and FIG. 2. FIG. 1 and FIG. 2 respectively are diagrams of an electronic device 10 in different views according to an embodiment of the present invention. The electronic device 10 includes a casing 12, a circuit board 14 and a movable socket 16. The casing 12 includes an opening structure 18 and a cover 20. The cover 20 pivots to a side of the opening structure 18. The circuit board 14 can be the motherboard. The movable socket 16 not in use is accommodated inside the casing 12; meanwhile, the cover 20 caps over the opening structure 18 to keep smooth appearance of the casing 12.

The movable socket 16 further can move relative to the casing 12 to rotatably push the cover 20, so as to protrude a part of the movable socket 16 from the opening structure 18 for connection with an external plug 22. Generally, the external plug 22 can be the universal serial bus (USB) plug, and the movable socket 16 can be the USB socket accordingly. The casing 12 further can include a torsional spring (not shown in figures) disposed between the cover 20 and the opening structure 18. Resilient recovering force of the torsional spring can keep the cover 20 over the opening structure 18 when the movable socket 16 does not protrude from the opening structure 18.

Figure 3:
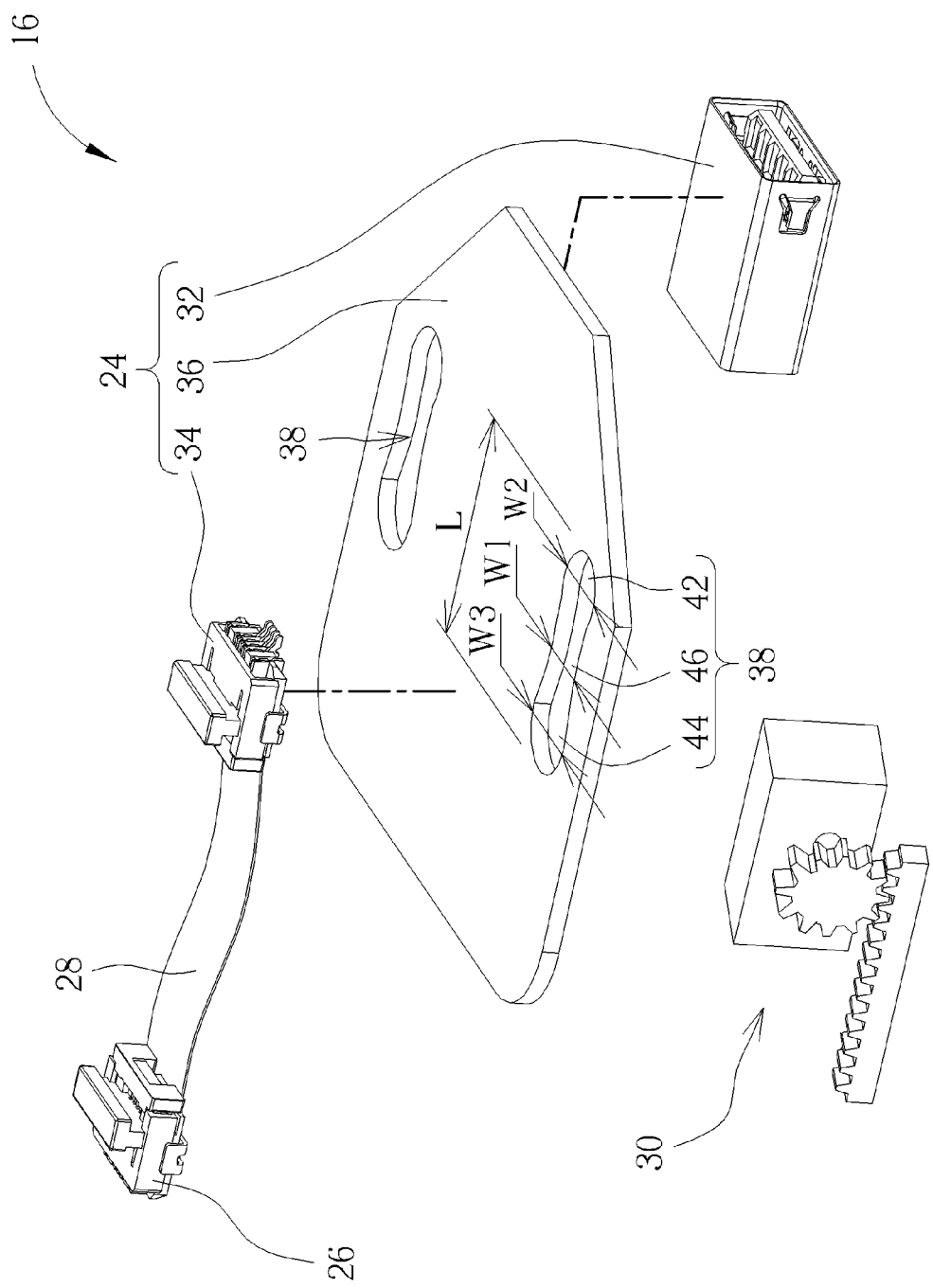
FIG. 3 is an exploded diagram of a movable socket according to the embodiment of the present invention.

Please refer to FIG. 1 to FIG. 3. FIG. 3 is an exploded diagram of the movable socket 16 according to the embodiment of the present invention. The movable socket 16 includes a first connector 24, a second connector 26, a soft cable 28 and a driving mechanism 30. The first connector 24 is slidably disposed on the casing 12. The first connector 24 can include a first terminal set 32, a second terminal set 34 and a supporting component 36. The first terminal set 32 can be the normal socket with the USB interface for connection with the external plug 22. The second terminal set 34 is an electrically connecting interface between the soft cable 28 and the supporting component 36 (the supporting component 36 can be the other circuit board). Two guiding slots 38 can be formed on a surface of the supporting component 36. The guiding slots 38 are slidably disposed on bosses 40 of the casing 12, and the movable socket 16 can slide relative to the casing 12 by combination of the guiding slot 38 and the boss 40. The boss 40 can be replaced by the specific screw.

The guiding slot 38 can include a first constraint portion 42, a second constraint portion 44 and a connecting portion 46. The first constraint portion 42 and the second constraint portion 44 are respectively disposed on two ends of the connecting portion 46. A width W1 of the connecting portion 46 can be substantially smaller than individual widths W2 and W3 of the first constraint portion 42 and the second constraint portion 44. When the movable socket 16 slides relative to the casing 12, and the boss 40 is wedged with the first constraint portion 42 (or the second constraint portion 44) of the guiding slot 38, movement of the supporting component 36 can be constrained by the guiding slot 38 due to structural design of the connecting portion 46, so as to ensure that the movable socket 16 can keep steady no matter what position the movable socket 16 is located.

For example, the movable socket 16 which is accommodated inside the casing 12 at an unused mode can be immovable, and the movable socket 16 which partly protrudes from the casing 12 at an used mode can also be immovable. The guiding slot 38 can prevent the boss 40 from accident slide between the constraint portions. It is to say, the movement of the movable socket 16 is limited by an active range of the boss 40 relative to the guiding slot 38, and the length L of the guiding slot 38 can substantially equal the movement distance of the movable socket 16. A width of the guiding slot 38 is not limited to the above-mentioned embodiment. The width W2 of the first constraint portion 42 and the width W3 of the second constraint portion 44 further can be respectively equal to the width W1 of the connecting portion 46. Thus, the boss 40 can be wedged with the guiding slot 38 slidably, and is constrained by a front end and a rear end of the guiding slot 38. Motion range of the boss 40 substantially equals the length L of the guiding slot 38.

In addition, the second connector 26 is disposed on the circuit board 14. Two ends of the soft cable 28 are electrically connected to the second terminal set 34 of the first connector 24 and the second connector 26, respectively. As the external plug 22 is connected to the first terminal set 32, an electronic signal of the external plug 22 can be transmitted from the first terminal set 32 to the second terminal set 34 via the supporting component 36, and then transmitted from the second terminal set 34 to the circuit board 14 via the soft cable 28 and the second connector 26, so as to establish transmission connection between the external plug 22 and the circuit board 14. The driving mechanism 30 is disposed between the first connector 24 and the casing 12. The driving mechanism 30 can move the first connector 24 in a manually pushing/pulling manner or in a mechanically driving manner.

The soft cable 28 is disposed between the first connector 24 and the second connector 26 in a structurally deformable manner. When the driving mechanism 30 moves the first connector 24, the second connector 26 is fixed on the circuit board 14 without movement, the soft cable 28 can be resiliently deformed to extend a distance between the first connector 24 and the second connector 26, so that the first connector 24 can push the cover 20 and protrudes from the opening structure 18.

Figure 4:
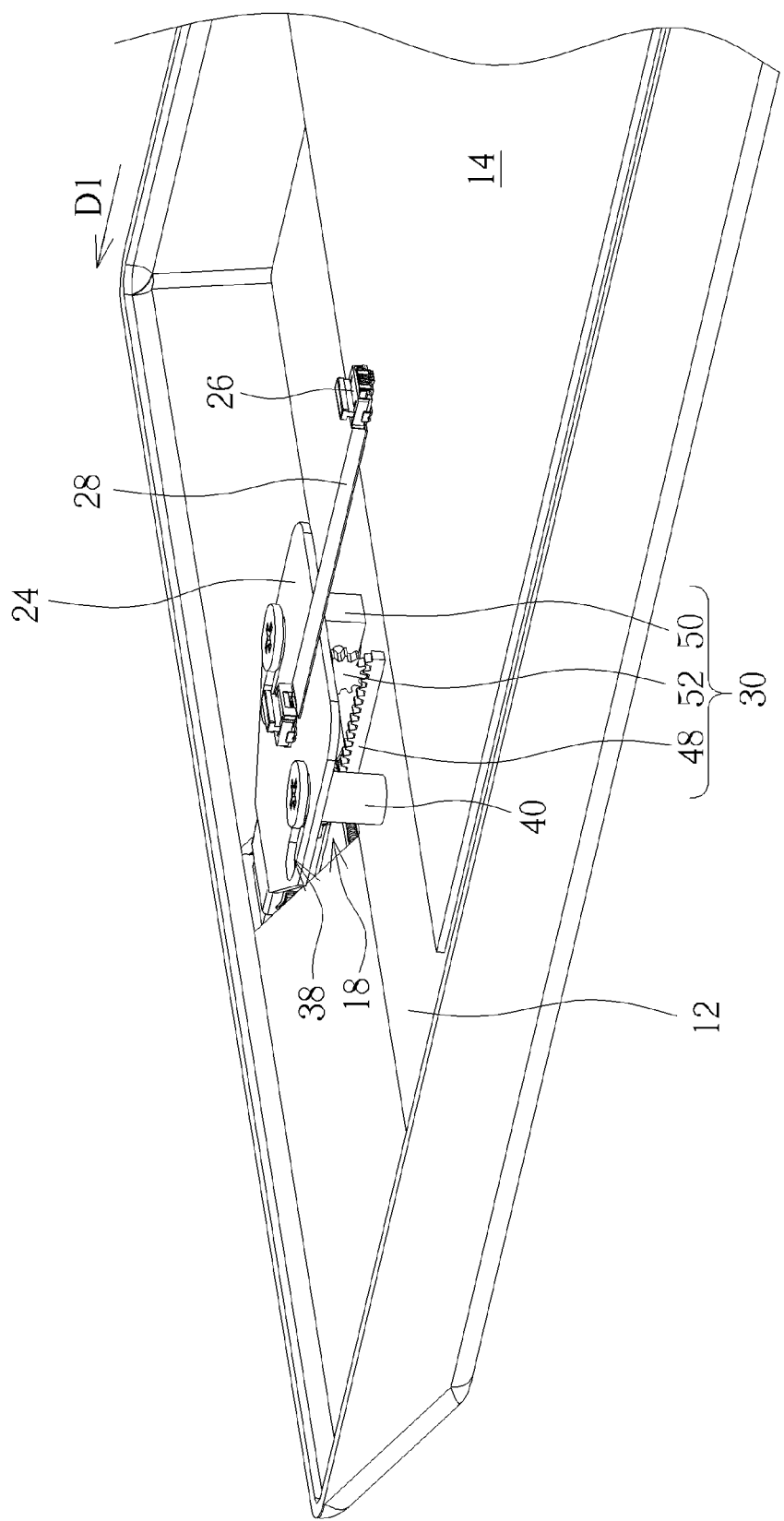
FIG. 4 is a diagram of a driving mechanism according to a first embodiment of the present invention.

Please refer to FIG. 1, FIG. 2 and FIG. 4. FIG. 4 is a diagram of the driving mechanism 30 according to a first embodiment of the present invention. The driving mechanism 30 includes a rack 48, a driver 50 and a gear 52. The rack 48 is disposed on the casing 12. The driver 50 is disposed on the first connector 24. The gear 52 is rotatably disposed on the shaft (not shown in figures) of the driver 50 and engaged with the rack 48. The user can utilize an inputting unit, such as the keyboard or the mouse, to input the control command. The driver 50 receives the control command to axially rotate the gear 52 by its shaft, so that the gear 52 moves along the rack 48, and the first connector 24 slides relative to the casing 12.

After the gear 52 moves relative to the rack 48 at the first direction D1 over a predetermined distance (such as the length L of the guiding slot 38), the first connector 24 can partly protrude from casing 12 through the opening structure 18. When the gear 52 moves relative to the rack 48 at a direction opposite to the first direction D1, the driving mechanism 30 can move the first connector 24 into the casing 12. A structural direction of the guiding slot 38 can be substantially parallel to the first direction D1.

Figure 5:
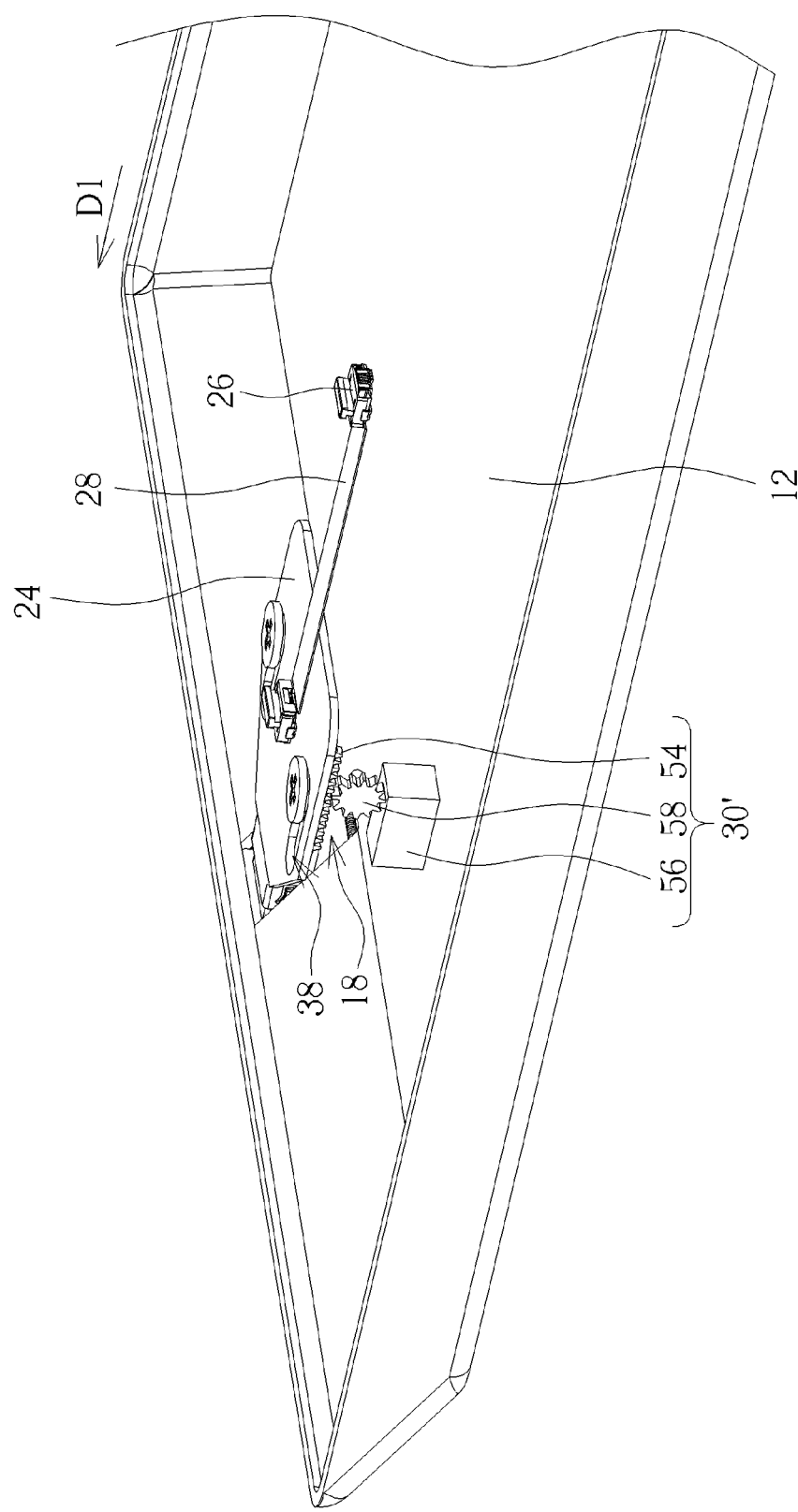
FIG. 5 is a diagram of the driving mechanism according to a second embodiment of the present invention.

Please refer to FIG. 1, FIG. 2 and FIG. 5. FIG. 5 is a diagram of the driving mechanism 30' according to a second embodiment of the present invention. The driving mechanism 30' includes a rack 54, a driver 56 and a gear 58. The rack 54 is disposed on the first connector 24. The driver 56 is disposed on the casing 12. The gear 58 is rotatably disposed on the shaft (not shown in figures) of the driver 56 and engaged with the rack 54. Difference between the first embodiment and the second embodiment is that components of the driving mechanism 30' are mostly disposed on the casing 12 to decrease loading of the first connector 24. Operation method of the second embodiment is similar to ones of the first embodiment. The user can input the control command by the inputting unit, the driver 56 reads the control command to axially rotate the gear 58 by its shaft to move the rack 54 relative to the gear 58, so as to move the first connector 24 relative to the casing 12. Therefore, the first connector 24 can protrude from and be accommodated into the opening structure 18 conveniently.

Figure 6:
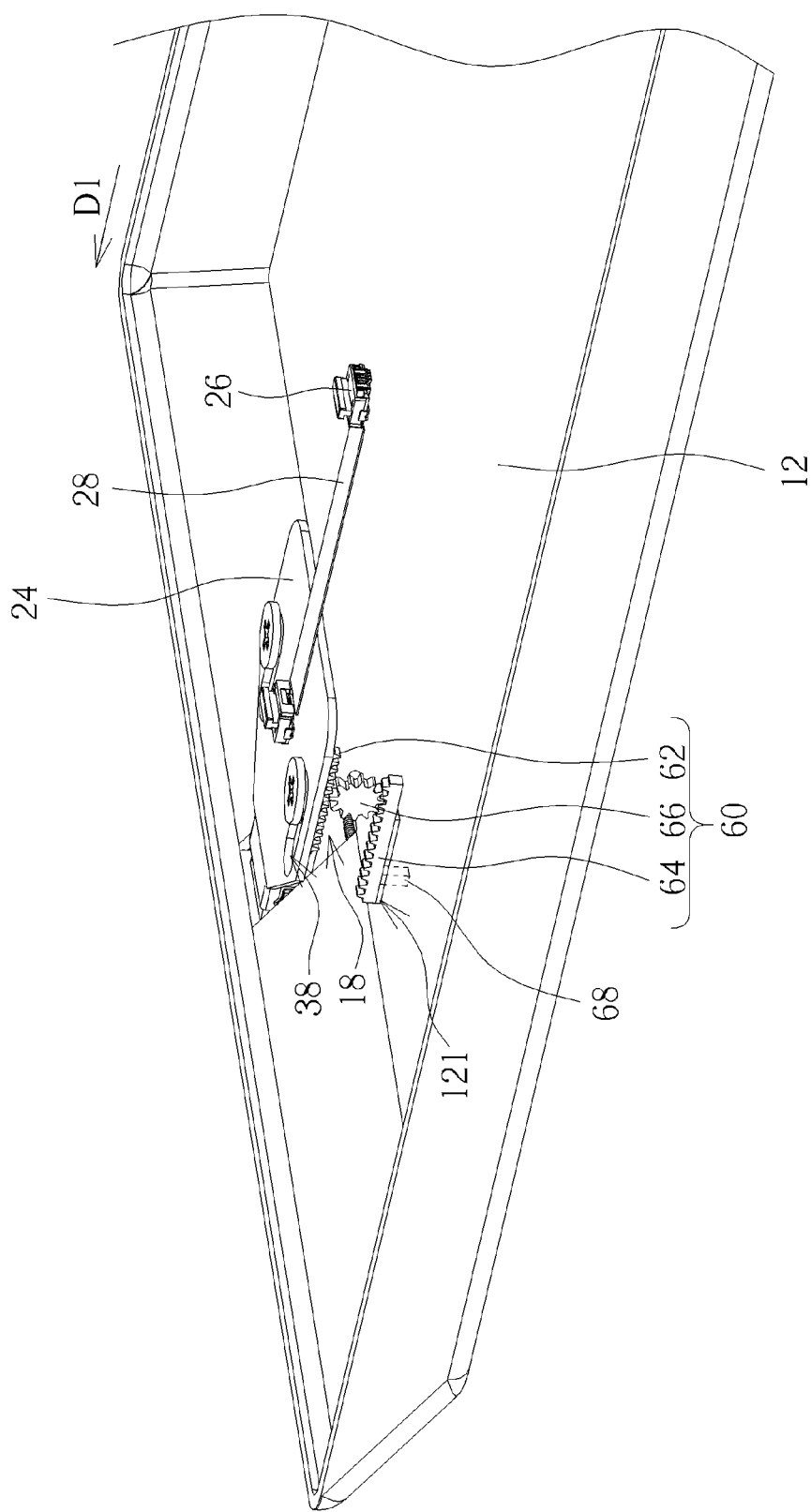
FIG. 6 is a diagram of the driving mechanism according to a third embodiment of the present invention.

Please refer to FIG. 1, FIG. 2 and FIG. 6. FIG. 6 is a diagram of the driving mechanism 60 according to a third embodiment of the present invention. The driving mechanism 60 includes a first rack 62, a second rack 64 and a bridging gear 66. The first rack 62 is disposed on the first connector 24. The second rack 64 is movably disposed on the casing 12. The second rack 64 includes a handle 68, which stretches from a bottom of the second rack 64 to pass through a slot 121 on the casing 12. The handle 68 can be operated manually from outer of the casing 12. The bridging gear 66 is engaged between the first rack 62 and the second rack 64. The handle 68 can slide along the slot 121 to move the second rack 64 relative to the casing 12. Movement of the second rack 64 can axially rotate the bridging gear 66, and then the bridging gear 66 drives the first rack 62, the first rack can move relative to the bridging gear 66 at the direction opposite to the moving direction of the handle 68. Therefore, the driving mechanism 60 can manually push or pull the first connector 24 to switch the operation modes of the movable socket. 16.

Figure 7:
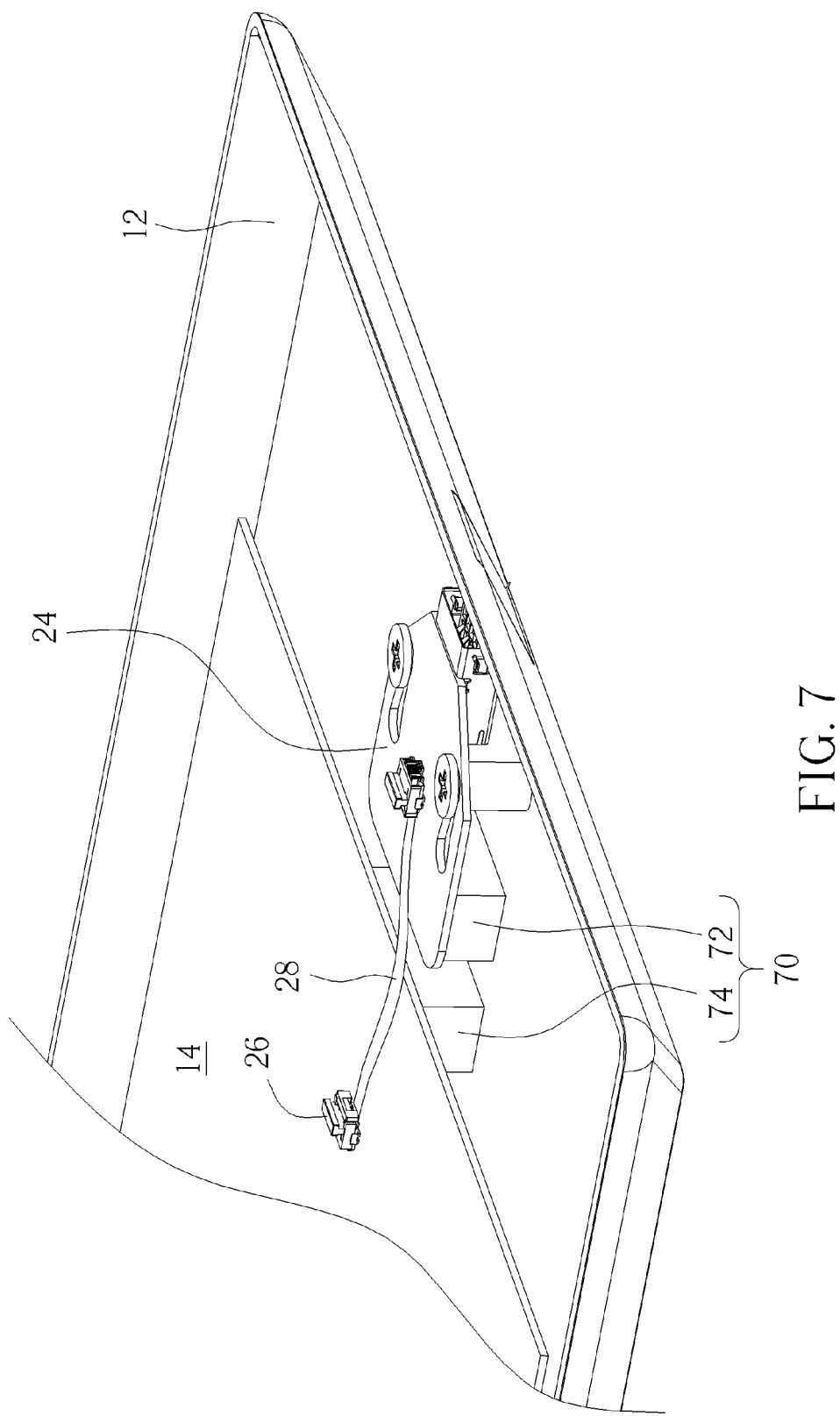
FIG. 7 is a diagram of the driving mechanism according to a fourth embodiment of the present invention.

Please refer to FIG. 1, FIG. 2 and FIG. 7. FIG. 7 is a diagram of the driving mechanism 70 according to a fourth embodiment of the present invention. The driving mechanism 70 includes a magnetic component 72 and an electromagnetic component 74. The magnetic component 72 is disposed on the first connector 24. The electromagnetic component 74 is disposed on the circuit board 14 and adjacent to the magnetic component 72. Because the electromagnetic component 74 is electrically connected to the circuit board 14, the electromagnetic component 74 can vary electromagnetic flux according to the control command from the circuit board 14, and a magnetic repulsive force can be generated to push the magnetic component 72 away from the electromagnetic component 74, which means the magnetic repulsive force can move the first connector 24 partly out of the casing 12 through the opening structure 18.

Besides, the electromagnetic component 74 and the magnetic component 72 can generate a magnetic attractive force to move the magnetic component 72 close to the electromagnetic component 74, and the first connector 24 can be accommodated inside the casing 12 with movement of the magnetic component 72 accordingly. Thus, the present invention can switch the operation modes of the movable socket 16 by automatically electric drive.

Figure 8:
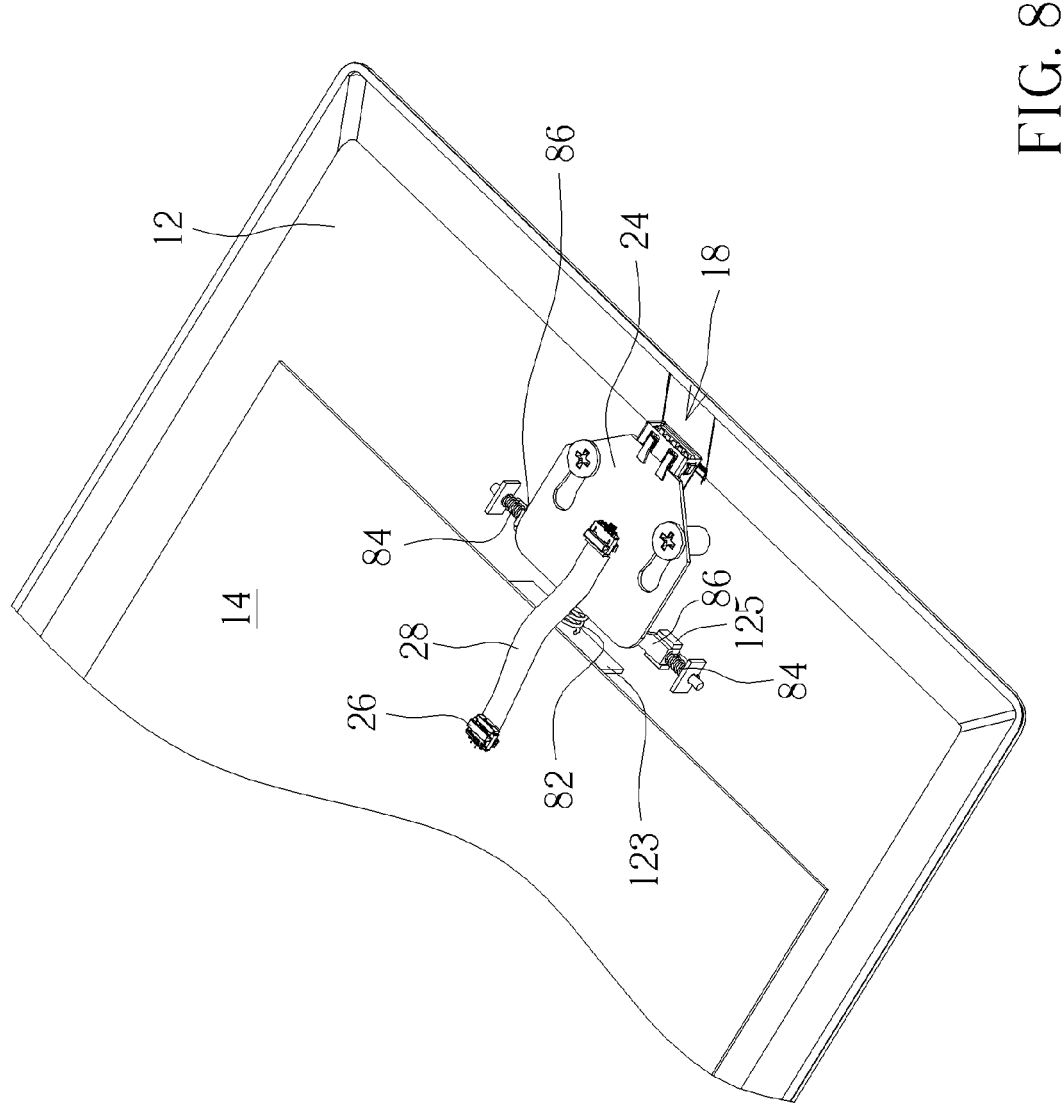
FIG. 8 and FIG. 9 respectively are diagrams of the driving mechanism in different views according to a fifth embodiment of the present invention.
Figure 9:
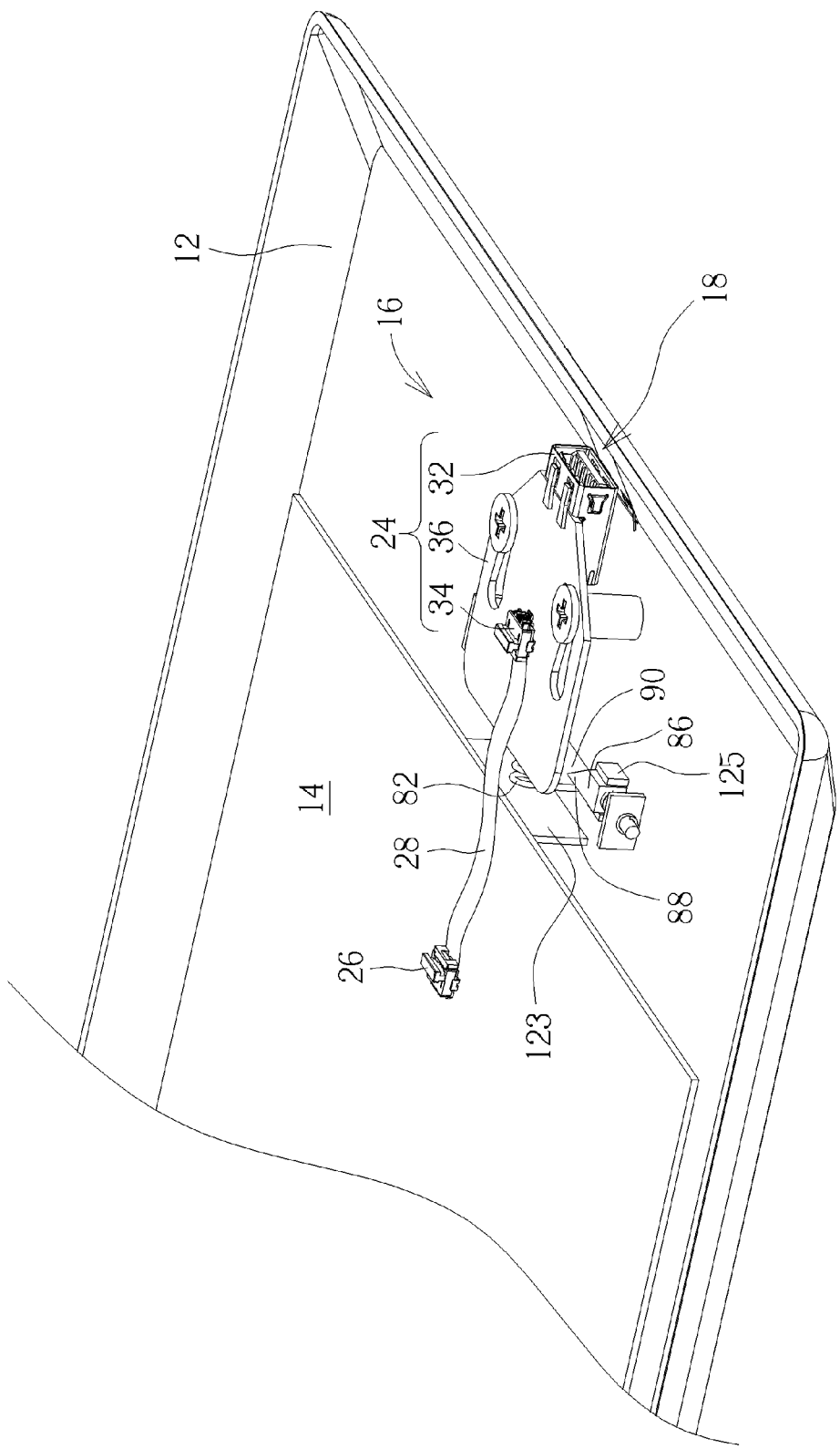

Please refer to FIG. 1, FIG. 2, FIG. 8 and FIG. 9. FIG. 8 and FIG. 9 respectively are diagrams of the driving mechanism 80 in different views according to a fifth embodiment of the present invention. The driving mechanism 80 includes a first resilient component 82, two second resilient components 84 and two constraining components 86. Two ends of the first resilient component 82 are respectively connected to a baffle 123 of the casing 12 and the first connector 24. Each constraining component 86 is movably disposed inside the sliding slot structure 125 on the casing 12, and each second resilient component 84 is disposed between the sliding slot structure 125 and the corresponding constraining component 86. The constraining component 86 includes an inclined guiding structure 88 disposed on a front end of the constraining component 86. The constraining component 86 further includes a handle (not shown in figures). The handle of the constraining component 86 can pass through the casing 12, and the user can manually control movement of the handle from the outer of the casing 12 to conveniently switch the operation modes of the movable socket 16.

Figure 10:
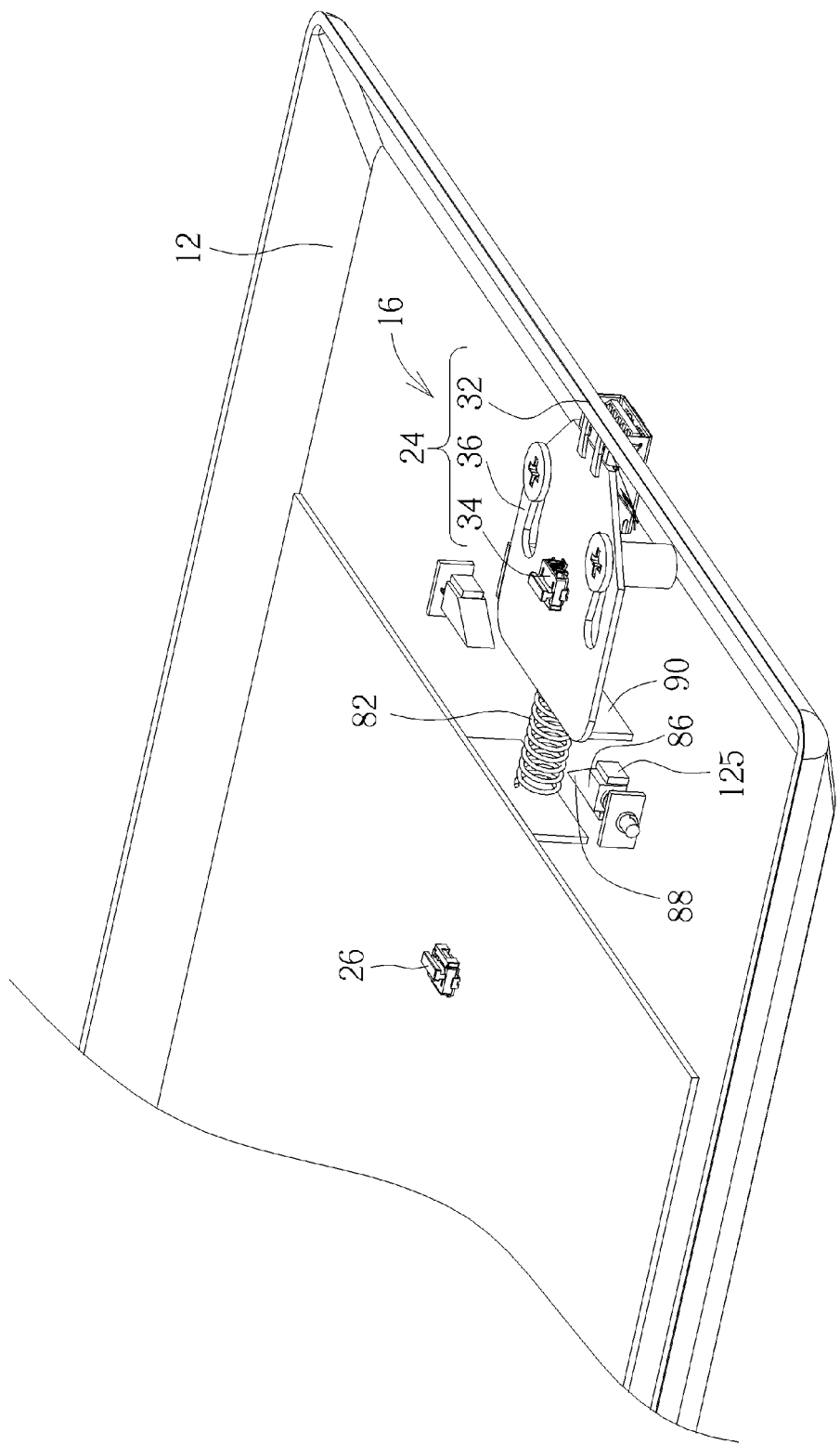
FIG. 10 is a diagram of the driving mechanism in different operation mode shown in FIG. 9.

Please refer to FIG. 8 to FIG. 10. FIG. 10 is a diagram of the driving mechanism 80 in different operation mode shown in FIG. 9. As shown in FIG. 9, the constraining component 86 contacts against the stretching portion 90 of the supporting component 36 of the first connector 24 to constrain the movement of the first connector 24 relative to the casing 12. At the time, the first resilient component 82 is compressed to store the resilient recovering force, and the first connector 24 is accommodated inside the casing 12. As shown in FIG. 10, the constraining component 86 can slide along the sliding slot 125 outwardly by the manually driving method. As the constraining component 86 is separated from the baffle 123 to release the structural interference, the resilient recovering force of the first resilient component 82 can push the first connector 24 outwardly via the stretching portion 90, so that the first connector 24 can partly protrude from the casing 12 through the opening structure 18, and the movable socket 16 is switched to the used mode.

Furthermore, the first connector 24 can be manually pushed into the casing 12. The stretching portion 90 can slide relative to the inclined guiding structure 88, and the constraining component 86 can slide along the sliding slot 125 outwardly to release the structural interference between the constraining component 86 and the stretching portion 90, so that the stretching portion 90 can move from the position shown in FIG. 10 to the position shown in FIG. 9. Meanwhile, the second resilient component 84 drives the constraining component 86 back to contact against the surface of the stretching portion 90, and the movable socket 16 can be switched to the unused mode.

In conclusion, the electronic device of the present invention has the movable socket for convenient application. The movable socket can move relative to the casing according to the user's demand, so that the movable socket of the present invention can be disposed on an inner place of the casing, and the lateral casing of the electronic device can be designed as the oblique structure or the round structure for thin-type appearance. The movable socket can be accommodated inside the casing when the movable socket is not in use, and the cover is utilized to cap over the opening structure for the aesthetic appearance. The driving mechanism can move the movable socket out of the casing for the connection with the external plug. The movable socket can rotate the cover and partly protrude from the casing, and then the external plug is easily connected to the movably socket.

The present invention further discloses several embodiments of the driving mechanism, which illustrates that the driving mechanism can include the combinations of the rack and the gear, the magnetic component and the electromagnetic component, or the resilient component and the constraining component. The driving mechanism of the movable socket can move the first connector into and out of the casing along the predetermined path manually or automatically; therefore, the present invention has advantages of the aesthetic appearance and the convenient operation, to effectively overcome drawbacks of difficult utilization of the conventional socket.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A movable socket disposed between a circuit board and a casing whereon an opening structure is formed, the movable socket comprising:
   a first connector slidably disposed on the casing, the first connector comprising a supporting component, a guiding slot being formed on a surface of the supporting component and slidably disposed on a boss of the casing, wherein the guiding slot comprises a first constraint portion, a second constraint portion and a connecting portion, the first constraint portion and the second constraint portion are respectively disposed on two ends of the connecting portion, and a width of the connecting portion is substantially smaller than widths of the first constraint portion and the second constraint portion;
   a second connector disposed on the circuit board;
   a soft cable disposed between the first connector and the second connector in a structurally deformable manner, two ends of the soft cable being electrically connected to the first connector and the second connector; and
   a driving mechanism disposed between the first connector and the casing, the driving mechanism moving the first connector relative to the casing, so as to protrude a part of the first connector from the casing through the opening structure.

2. The movable socket of claim 1, wherein the driving mechanism comprises:
   a rack disposed on the casing;
   a driver disposed on the first connector, the driver comprising a shaft; and
   a gear rotatably disposed on the shaft of the driver and engaged with the rack, the driver axially rotating the gear via the shaft so as to move the gear relative to the rack.

3. The movable socket of claim 1, wherein the driving mechanism comprises:
   a rack disposed on the first connector;
   a driver disposed on the casing, the driver comprising a shaft; and
   a gear rotatably disposed on the shaft of the driver and engaged with the rack, the driver axially rotating the gear via the shaft so as to move the gear relative to the rack.

4. The movable socket of claim 1, wherein the driving mechanism comprises:
   a first rack disposed on the first connector;
   a second rack movably disposed on the casing; and
   a bridging gear engaged between the first rack and the second rack, the second rack moving relative to the casing so as to drive the first rack via the bridging gear.

5. The movable socket of claim 1, wherein the driving mechanism comprises:
   a magnetic component disposed on the first connector; and
   an electromagnetic component electrically connected to the circuit board and adjacent to the magnetic component, the electromagnetic component and the magnetic component generating a magnetic force to move the first connector relative to the casing.

6. The movable socket of claim 1, wherein the driving mechanism comprises:
   a first resilient component for moving the part of the first connector out of the casing via the opening structure, two ends of the first resilient component being respectively disposed on the first connector and the casing; and
   a constraining component movably disposed inside the casing for constraining a movement of the first connector relative to the casing.

7. The movable socket of claim 6, wherein the casing comprises a sliding slot structure where inside the constraining component is disposed, and the driving mechanism further comprises a second resilient component disposed between the constraining component and the sliding slot structure.

8. The movable socket of claim 6, wherein the constraining component comprises an inclined guiding structure, the first connector pushes the inclined guiding structure to move the constraining component relative to the casing.

9. An electronic device comprising:
   a casing, the casing comprising an opening structure and a cover, the cover pivoting to a side of the opening structure for covering the opening structure;
   a circuit board disposed inside the casing; and
   a movable socket, the movable socket comprising:
      a first connector slidably disposed on the casing, the first connector comprising a supporting component, a guiding slot being formed on a surface of the supporting component and slidably disposed on a boss of the casing, wherein the guiding slot comprises a first constraint portion, a second constraint portion and a connecting portion, the first constraint portion and the second constraint portion are respectively disposed on two ends of the connecting portion, and a width of the connecting portion is substantially smaller than widths of the first constraint portion and the second constraint portion;
a second connector disposed on the circuit board;
a soft cable disposed between the first connector and the second connector in a structurally deformable manner, two ends of the soft cable being electrically connected to the first connector and the second connector; and
a driving mechanism disposed between the first connector and the casing, the driving mechanism moving the first connector relative to the casing, so as to protrude a part of the first connector from the casing through the opening structure.

10. The electronic device of claim 9, wherein the driving mechanism comprises:
a rack disposed on the casing;
a driver disposed on the first connector, the driver comprising a shaft; and
a gear rotatably disposed on the shaft of the driver and engaged with the rack, the driver axially rotating the gear via the shaft so as to move the gear relative to the rack.

11. The electronic device of claim 9, wherein the driving mechanism comprises:
a rack disposed on the first connector;
a driver disposed on the casing, the driver comprising a shaft; and
a gear rotatably disposed on the shaft of the driver and engaged with the rack, the driver axially rotating the gear via the shaft so as to move the gear relative to the rack.

12. The electronic device of claim 9, wherein the driving mechanism comprises:
a first rack disposed on the first connector;
a second rack movably disposed on the casing; and
a bridging gear engaged between the first rack and the second rack, the second rack moving relative to the casing so as to drive the first rack via the bridging gear.

13. The electronic device of claim 9, wherein the driving mechanism comprises:
a magnetic component disposed on the first connector; and
an electromagnetic component electrically connected to the circuit board and adjacent to the magnetic component, the electromagnetic component and the magnetic component generating a magnetic force to move the first connector relative to the casing.

14. The electronic device of claim 9, wherein the driving mechanism comprises:
a first resilient component for moving the part of the first connector out of the casing via the opening structure, two ends of the first resilient component being respectively disposed on the first connector and the casing; and
a constraining component movably disposed inside the casing for constraining a movement of the first connector relative to the casing.

15. The electronic device of claim 14, wherein the casing comprises a sliding slot structure where inside the constraining component is disposed, and the driving mechanism further comprises a second resilient component disposed between the constraining component and the sliding slot structure.

16. The electronic device of claim 14, wherein the constraining component comprises an inclined guiding structure, the first connector pushes the inclined guiding structure to move the constraining component relative to the casing.

* * * * *